US009231938B2

(12) United States Patent
Landa et al.

(10) Patent No.: US 9,231,938 B2
(45) Date of Patent: Jan. 5, 2016

(54) DETERMINATION AND CLASSIFICATION OF DEFENSE MEASURES IN WEB APPLICATIONS

(71) Applicant: International Business Machines Corporation, Armonk, NY (US)

(72) Inventors: Alexander Landa, Haifa (IL); Omer Tripp, Har Adar (IL)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 14/155,861

(22) Filed: Jan. 15, 2014

(65) Prior Publication Data

US 2015/0200931 A1      Jul. 16, 2015

(51) Int. Cl.
  *H04L 29/06* (2006.01)
(52) U.S. Cl.
  CPC .......... *H04L 63/0807* (2013.01); *H04L 63/145* (2013.01); *H04L 63/1466* (2013.01)
(58) Field of Classification Search
  CPC . H04L 63/08; H04L 63/0853; H04L 63/0807; H04L 63/10; H04W 12/06
  See application file for complete search history.

(56) References Cited

U.S. PATENT DOCUMENTS

| 7,013,395 | B1* | 3/2006 | Swiler et al. | 726/25 |
|---|---|---|---|---|
| 7,096,502 | B1* | 8/2006 | Fox et al. | 726/25 |
| 8,087,088 | B1* | 12/2011 | Pennington et al. | 726/25 |
| 8,266,700 | B2* | 9/2012 | Sima et al. | 726/25 |
| 8,302,080 | B2 | 10/2012 | Wassermann et al. | |
| 2006/0185005 | A1* | 8/2006 | Graves et al. | 726/9 |
| 2009/0260073 | A1* | 10/2009 | Jeong et al. | 726/9 |
| 2010/0186078 | A1* | 7/2010 | Napoli et al. | 726/9 |
| 2010/0293616 | A1* | 11/2010 | Young | 726/25 |
| 2011/0107411 | A1* | 5/2011 | McClain et al. | 726/9 |
| 2012/0304249 | A1 | 11/2012 | Luo et al. | |
| 2013/0007886 | A1* | 1/2013 | Tripp et al. | 726/25 |
| 2013/0007887 | A1* | 1/2013 | Haviv et al. | 726/25 |
| 2013/0055397 | A1* | 2/2013 | Amit et al. | 726/25 |
| 2013/0091578 | A1* | 4/2013 | Bisht et al. | 726/25 |

OTHER PUBLICATIONS

Fong et al., "Building a Test Suite for Web Application Scanners", 2008, pp. 1-8.*
Cortesi, Agostino et al, "Widening Operators for Abstract Interpretation" Sixth IEEE International Conference on Software Engineering and Formal Methods, 2008, pp. 31-40.
Li, Nuo et al., "Perturbation-based user-input-validation testing of web applications", The Journal of Systems and Software 83 (2010) 2263-2274, 2010, 12 pages.

(Continued)

*Primary Examiner* — Yonas Bayou
(74) *Attorney, Agent, or Firm* — Cantor Colburn LLP; Edward Choi (57) ABSTRACT

Techniques for determining classifications of defense measures as described herein. Security tokens are identified to be used to test defense measures of a web application. Combinations of security tokens are determined, wherein the combinations of security tokens are related to classifications of the defense measures. A combination is executed at an input point of the web application. Based on the output of the web application received in response to the executed combination, a classification for a defense measure of the web application is determined.

6 Claims, 5 Drawing Sheets

(56) References Cited

OTHER PUBLICATIONS

Petukhov, Andrey et al, "Detecting Security Vulnerabilities in Web Applications Using Dynamic Analysis with Penetration Testing", OWASP (The Open Web Application Security Project), Application Security Conference, Ghent, Belgium, May 2008, 16 pages.

Saxena, Prateek, "Systematic Techniques for Finding and Preventing Script Injection Vulnerabilities", A dissertation submitted in partial satisfaction of the requirements for the degree of Doctor of Philosophy in Computer Science in the Graduate Division of the University of California at Berekeley, Technical Report No. UCB/EECS-2012-170, 2012, located at http://www.eecs.berkeley.edu/PubsfTechRpts/2012/EECS-2012-170.html, 168 pages.

Scholte, Theodoor et al, "Preventing Input Validation Vulnerabilities in Web Applications through Automated Type Analysis", IEEE 36th Annual Computer Software and Applications Conference (COMPSAC), 2012, pp. 233-243.

Wan, Min et al, "An Improved Eliminating SQL Injection Attacks Based Regular Expressions Matching", 2012 International Conference on Control Engineering and Communication Technology, 2012, pp. 210-212.

* cited by examiner

DETERMINATION AND CLASSIFICATION OF DEFENSE MEASURES IN WEB APPLICATIONS

BACKGROUND

The present disclosure relates generally to security testing of web applications. More specifically, the techniques described herein include classifications of defense measures implemented in web applications.

SUMMARY

In one embodiment, a method for classification of defense measures of a web application is described herein. Security tokens are identified. The security tokens are used to test the defense measures of the web application. Combinations of the security tokens are determined, wherein the combinations are related to classifications of the defense measures. A combination of security tokens are executed at an input point of the web application, and the classifications for the defense measures are determined based on the out of the web application received in response to the executed combination.

DETAILED DESCRIPTION

The embodiments disclosed herein relate to techniques for determining and classifying defense measures implemented in web applications. Webpages may implement security measures to prevent malicious attacks to be carried out via malicious code entered into the web application. For example, defense measures may include regular expressions configured to parse a string and determine the existence of malicious code.

Testing of the defense measures is helpful to determine the effectiveness of a given defense measure, and in some cases may determine the type of defense measure implemented. Testing may include audits wherein possible security vulnerabilities are identified by executing strings at a given input point to determine whether the defense measures are successful. In some cases, defense measures may be discovered by executing common security tokens that, for example within a string, may elicit a given response if the defense measures are designed to restrict the security tokens. In many cases, defense measures are sophisticated enough such that a given combination of security tokens may be allowed, while other combinations of security tokens may be restricted. Further, a given restriction resulting from a given combination may indicate that a type, or a class, of defense measures is implemented in the web application. In the embodiments described herein, combinations of security tokens associated with a given classification may be executed at an input point of the web application. The resulting output may be used to determine whether a classification of defense measures is implemented in the web application.

Figure 1:
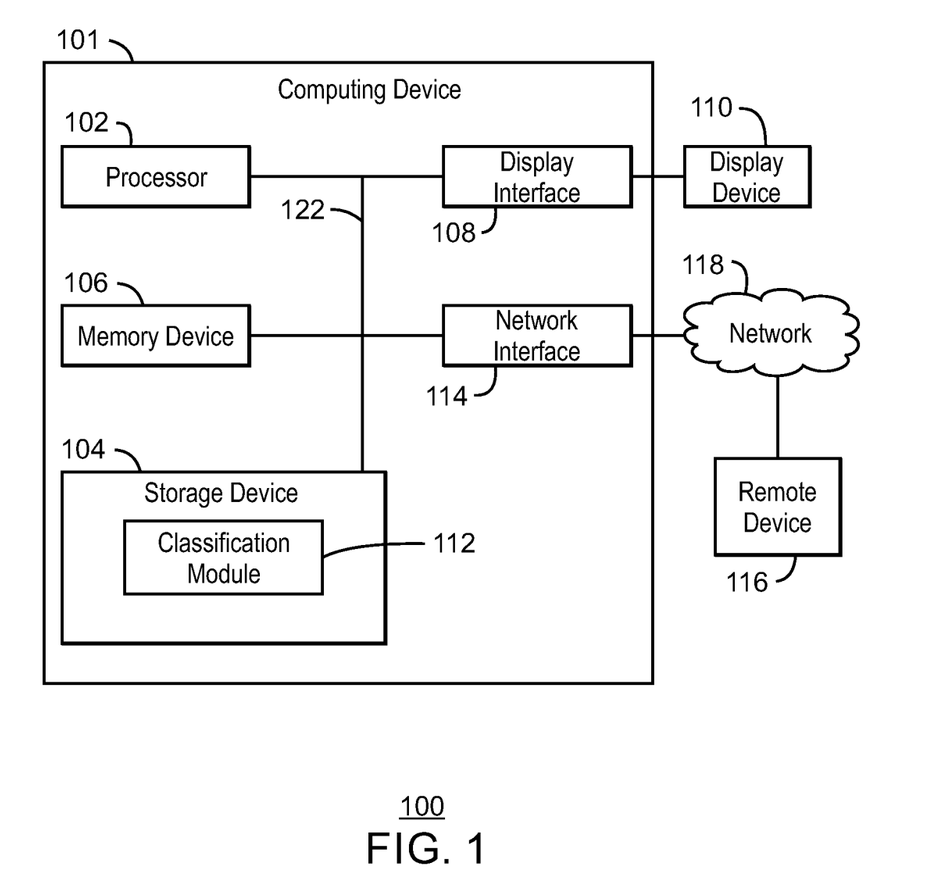
FIG. 1 is a block diagram of a computing system configured to determine classifications of defense measures of a web application.

FIG. 1 is a block diagram of a computing system configured to determine classifications of defense measures of a web application. The computing system 100 may include a computing device 101 having a processor 102, a storage device 104 comprising a non-transitory computer-readable medium, a memory device 106, a display interface 108 communicatively coupled to a display device 110. The computing device 101 may include a network interface 114 communicatively coupled to a remote device 116 via a network 118. The storage device 104 may include a classification module 112 configured to determine classifications of defense measures of a web application. In embodiments, the web application is be accessed via the network and is hosted on the remote device 116. In some embodiments, the display interface 108 may enable a user of the computing system 101 to view the web application, and/or view the results of the defense measure classifications. The display device 110 may be an external component to the computing device 101, an integrated component of the computing device 101, or any combination thereof.

The classification module 112 may be logic, at least partially comprising hardware logic. In embodiments, the classification module 112 may be implemented as instructions executable by a processing device, such as the processor 102. The instructions may direct the processor 102 to identify security tokens to be used to test defense measures of a web application, and determine combinations of the security tokens that are related to classifications of the defense measures. The combinations may be executed at an input point of the web application and a classification may be determined for a defense measure of the web application based on an output of the web application received in response to the executed application.

The processor 102 may be a main processor that is adapted to execute the stored instructions. The processor 102 may be a single core processor, a multi-core processor, a computing cluster, or any number of other configurations. The memory unit 106 can include random access memory, read only memory, flash memory, or any other suitable memory systems. The main processor 102 may be connected through a system bus 122 to components including the memory 106, the storage device 104, and the display interface 108.

The block diagram of FIG. 1 is not intended to indicate that the computing device 101 is to include all of the components shown in FIG. 1. Further, the computing device 101 may include any number of additional components not shown in FIG. 1, depending on the details of the specific implementation.

Figure 2:
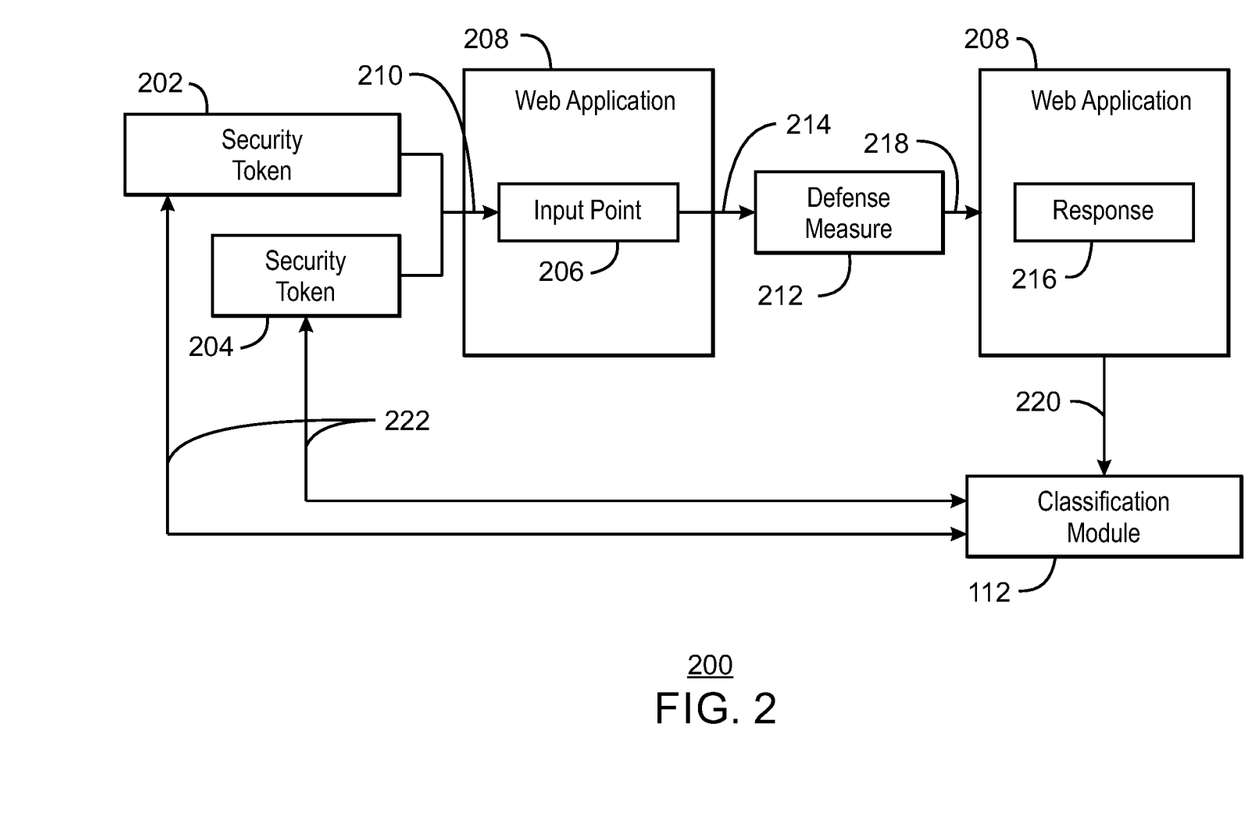
FIG. 2 is a block diagram of a system for determining defense measures of a web application.

FIG. 2 is a block diagram of a system for determining defense measures of a web application. As illustrated in FIG. 2, security tokens 202, 204 are provided to an input point 206 of a web application 208, as indicated by the arrow 210. The security tokens 202, 204 may be associated with a classification of defense measures. In embodiments, the combination of security tokens 202, 204 used may be determined by the classification module 112, as indicated by the arrows 212. In embodiments, the combination of security tokens 202, 204, are randomly selected and the combination is provided to the classification module 112 to verify whether the combination is related to a classification of defense measures.

The combination of security tokens 202, 204, is executed at the input point 206. The web application 208 may be configured to provide the combination of security tokens 202, 204, to a defense measure 212, as indicated by the arrow 214. The defense measure 212 may then provide a response 216 within the web application 208, as indicated by the arrow 218. The response 216 may be provided to the classification module 112, as indicated by the arrow 220, wherein the classification module 112 may classify the defense measure 212 based on the combination of security tokens 202, 204 executed at the input point 206 and based on the response 216 received.

In embodiments, the defense measure 212 may be a regular expression configured to detect the presence of potentially malicious code entered in a string at the input point. The combination of security tokens 202, 204, may be input at the input point 206 as a string containing potentially malicious code. For example, security token 202 may be contain the characters "script" and the security token 204 may contain a left parenthesis character "(." For example, a defense measure, such as a regular expression, may allow the characters "script" to be entered, but not when the characters "script" are followed by the left parenthesis character "(." In this scenario, a string containing "script" followed by a left parenthesis may be identified as potentially malicious. This type of defense measure may be defined as a correlation constraint wherein one security token is not allowed when a second security token is found in the same string executed at the input point 206. The classification module 112 may, therefore, classify the defense measure 212 to at least include a correlation constraint.

As another example, the defense measure 212 may include an offset constraint. In this scenario, the defense measure 212 may allow certain combinations of security tokens, such as the combination of security tokens 202, 204, as long as the security tokens are offset from one another by a given number of characters in the string. For example, the security token "(" may be allowed to follow the security token "script" as long as the two security tokens are offset from each other by a certain number of characters.

As described above, the classification module 112 may be useful in determining the types of defense measures implemented in at web application. In the embodiments described herein, the classification module 112 enables contextual classification of defense measures and a nuanced understanding of the defense measure based on the correlation between combinations of defense measures and known classification types.

Figure 3:
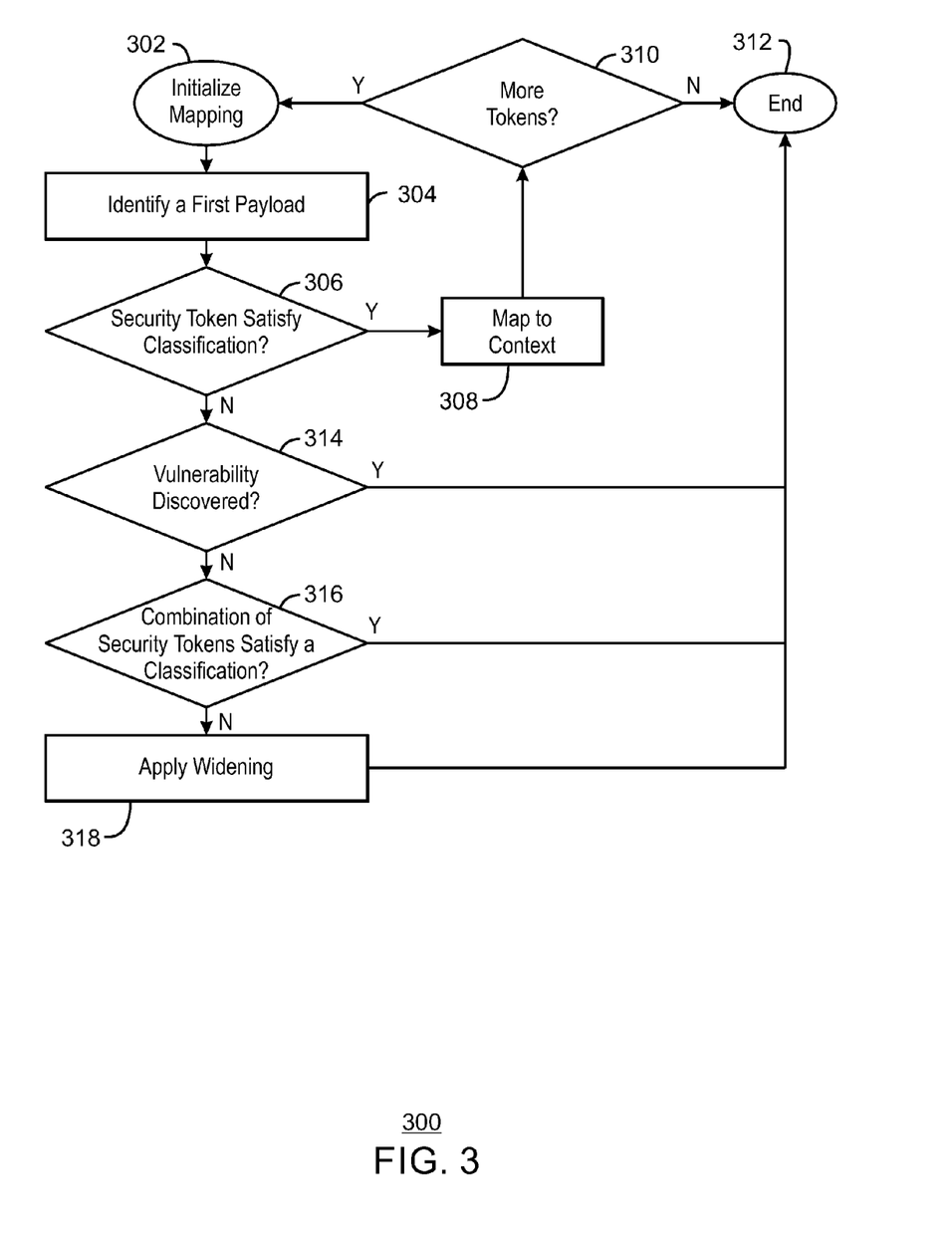
FIG. 3 is a process flow diagram illustrating mapping of security tokens to classifications.

FIG. 3 is a process flow diagram illustrating mapping of security tokens to classifications. As illustrated in FIG. 3, the process 300 may initialize at 302, wherein security tokens are initially mapped to Boolean values as an empty map. A first available payload, including one or more security tokens, may be identified at 304. At block 306, it is determined whether there is a security token within the first payload that satisfies a classification "C." If there is a security token satisfying a classification C, then that security token is mapped to that classification at 308. At 310, the process 300 may ask whether there are more tokens within the first payload to evaluate, and if there are, then the process resumes as 302. If there are not, the process 300 ends at 312.

However, if the first payload does not contain a security token satisfying a given context, then process continues at 314 wherein the process 300 determines whether the defense measures have a vulnerability. A vulnerability may be discovered when a web application does not restrict a payload containing security tokens. If a vulnerability is discovered, then process 300 may terminate at 312. Otherwise, the process 300 may identify combinations of security tokens within the first payload that may map to a given classification at 316. If a combination of security tokens within the first payload maps to a given classification 316, then the process 300 may proceed to terminate at 312. If combinations do not map to a given classification at 316, then a widening threshold may be applied at 318. The widening threshold is to enable mapping of a combination of security tokens within a predetermined threshold for error. Once the widening threshold has been applied, the process may terminate at 312.

The process 300 may be used to classify a defense measure without executing every security token combination related to the classification. For example, once a defense measure has been discovered to enforce a correlation constraint, additional combinations of security tokens that would be restricted by the correlation constraint may not be required to be executed. In some embodiments, the determination of whether a given constraint satisfies a given classification may be based on domain knowledge of experts in the field. In this scenario, the domain knowledge indicates when a given security token combination may be representative of an entire classification of defense measures.

Figure 4:
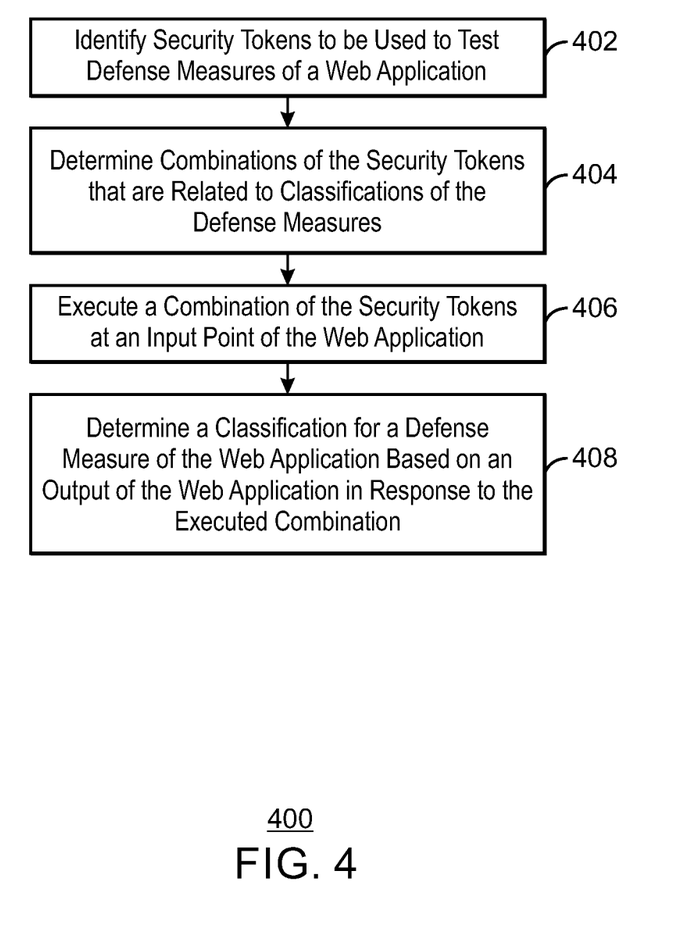
FIG. 4 is a block diagram illustrating a method of determining classifications of defense measures.

FIG. 4 is a block diagram illustrating a method of determining classifications of defense measures. The method 400 may begin at block 402 wherein security tokens are identified to be used to test defense measures of a web application. Combinations of security tokens are determined at 404, wherein the combinations of security tokens are related to classifications of the defense measures. A combination is executed at an input point of the web application at block 406. Based on the output of the web application received in response to the executed combination, a classification for a defense measure of the web application is determined at block 408.

As will be appreciated by one skilled in the art, embodiments may be implemented as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for the embodiments may be written in any combination of one or more programming languages, including an object oriented programming language such as Java, Smalltalk, C++, JavaScript, objective C and C#, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
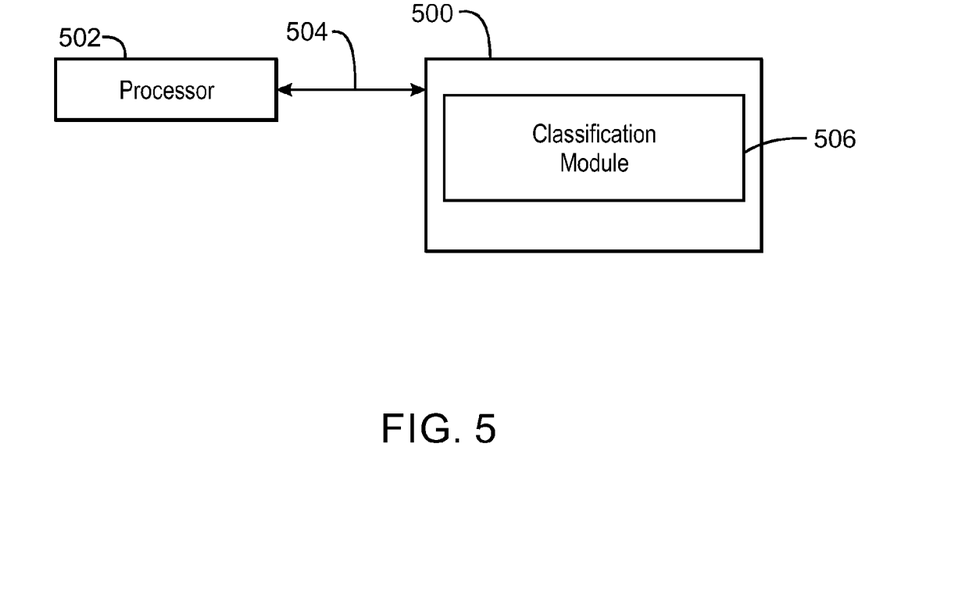
FIG. 5 is a block diagram depicting an example of a tangible, non-transitory computer-readable medium that can be used to determine classifications of defense measures.

FIG. 5 is a block diagram depicting an example of a tangible, non-transitory computer-readable medium that can be used to determine classifications of defense measures. The tangible, non-transitory, computer-readable medium 500 may be accessed by a processor 502 over a computer bus 504. Furthermore, the tangible, non-transitory, computer-readable medium 500 may include computer-executable instructions to direct the processor 502 to perform the steps of the current method.

The various software components discussed herein may be stored on the tangible, non-transitory, computer-readable medium 500, as indicated in FIG. 5. For example, a classification module 506 may be configured to identify security tokens to be used to test defense measures of a web application, and determine combinations of the security tokens that are related to classifications of the defense measures. The classification module may execute a combination of the security tokens at an input point of the web application, and determine a classification for a defense measure of the web application based on an output of the web application in response to the executed combination.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments provided herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device, comprising:
   a storage device; and
   a processor,
   the storage device having instructions that when executed by the processor, cause the computing device to:
   identify security tokens to be used to test defense measures of a web application;
   determine combinations of the security tokens that are related to classifications of the defense measures;
   execute one of the combinations of the security tokens at an input point of the web application;
   determine a classification for a defense measure of the web application based on an output of the web application in response to the executed one of the combinations; and
   widening the classification determination to account for a measure of error.

2. The computing device of claim 1, wherein the defense measures comprise constraints on the combinations for execution at the input point of the web application, and wherein the classification identifies types of security constraints of the web application.

3. The computing device of claim 2, wherein the constraints comprise at least one of:

offset constraints wherein a defense measure responds to a security token combination based on an offset of a security token in relationship to another security token within the combination; and correlation constraints wherein a defense measure response to a security token combination based on whether two or more security tokens are present within the security token combination.

4. The computing device of claim 1, wherein the classification is determined without executing every security token combination related to the classification.

5. The computing device of claim 4, wherein the classification is determined without executing every security token combination related to the classification based on domain knowledge indicating a given security token combination is representative of an entire classification of defense measures.

6. The computing device of claim 1, wherein determining the classification for defense measures comprises mapping combinations of security tokens to each other based on the output of the web application.

\* \* \* \* \*